(No Model.) 2 Sheets—Sheet 1.
T. MAXON.
DISK HARROW.
No. 435,846. Patented Sept. 2, 1890.
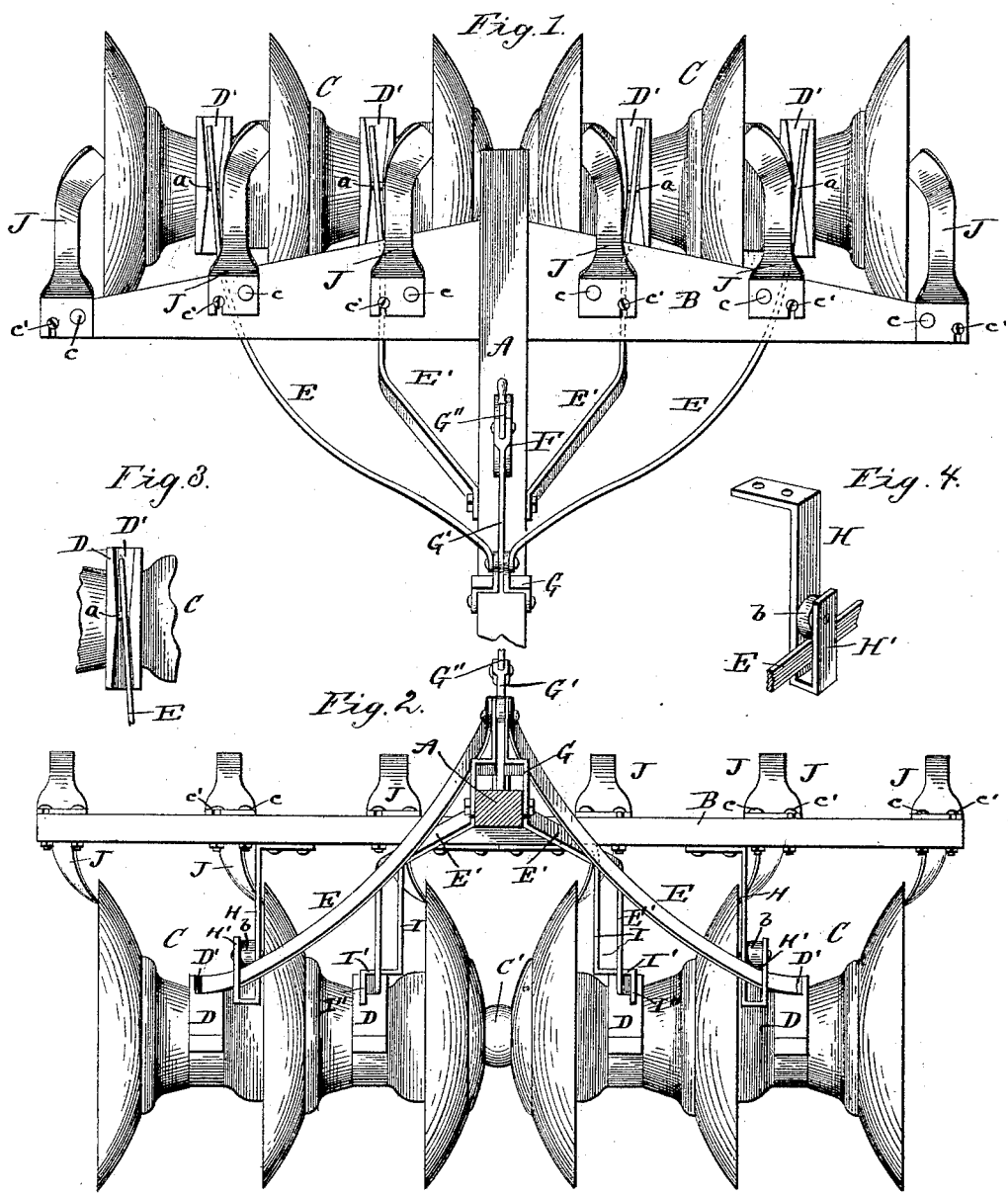
WITNESSES:
Edwin L. Bradford
C. D. Davis
INVENTOR
Thomas Maxon
BY C. M. Alexander
ATTORNEY.

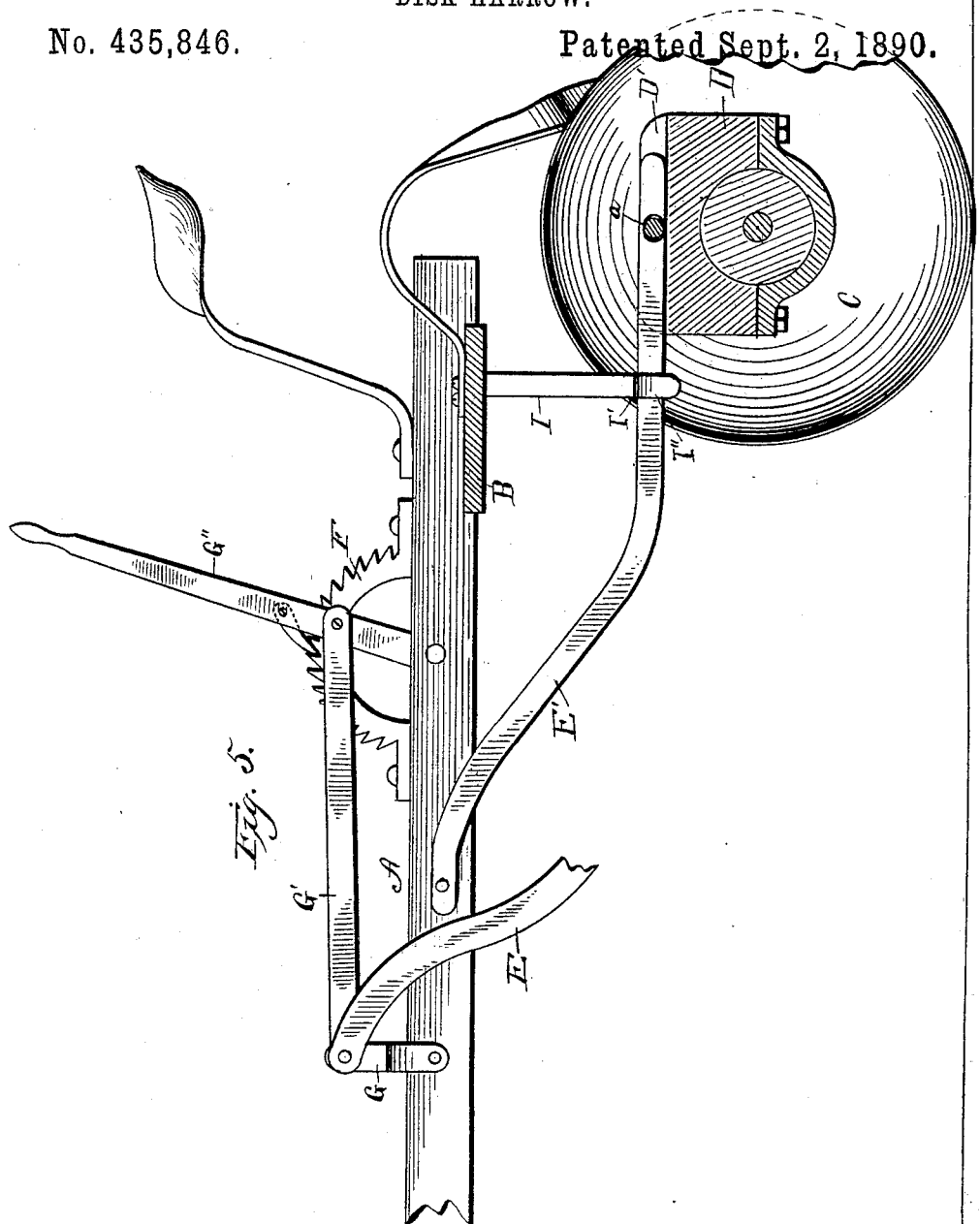

UNITED STATES PATENT OFFICE.

THOMAS MAXON, OF DAYTON, OHIO.

DISK HARROW.

SPECIFICATION forming part of Letters Patent No. 435,846, dated September 2, 1890.

Application filed January 23, 1890. Serial No. 337,855. (No model.)

*To all whom it may concern:*

Be it known that I, THOMAS MAXON, a citizen of the United States, residing at Dayton, in the county of Montgomery and State of Ohio, have invented certain new and useful Improvements in Disk Harrows, of which the following is a specification, reference being had therein to the accompanying drawings, in which—

Figure 1 represents a plan view of my improved harrow; Fig. 2, a front elevation thereof; Fig. 3, a detail plan view of one of the bearings; Fig. 4, a detail perspective view of one of the hangers; Fig. 5, a vertical sectional view of the complete harrow.

Referring to the drawings by letter, A designates the tongue, which has rigidly secured to it at or near its rear end a cross-beam B, which extends the full length of the gangs C. These two gangs abut against an interposed sphere C' and are provided with the usual concavo-convex disks. These gangs have their axles journaled in boxes D, located between the disks, and these boxes have formed in their upper faces grooves D', which run at right angles to the gang-axles. Pivoted loosely in the grooves D', by means of pivots $a$, (located directly over and in line with the gang-axles,) are the rear ends of forwardly-extending shifting and draft rods E E E' E'. The two inner draft-rods E' are bent upwardly and pivotally bolted upon opposite sides of the tongue, and the two outer rods E are curved forwardly and upwardly and pivotally connected to the upper end of a lever G, pivoted upon the tongue, this lever G being connected by means of a link or bar G' to a suitable operating-lever G'', also pivoted upon the tongue and operating in conjunction with the usual toothed segment F. The two outer rods E pass through loops H', formed on the lower ends of rigid hangers H, depending from the beam B, the said loops being provided with rollers $b$, which bear and roll upon the upper edges of said rods. The inner rods E' pass under and bear upon angular extensions or arms I', formed on the lower ends of hangers I, bolted rigidly to the cross-beam. The outer ends of the horizontal arms I' are provided with downward extensions I'', for a purpose hereinafter stated.

Spring-scrapers J are bolted to the beam B and are curved upwardly and rearwardly a sufficient distance to terminate within close proximity to the concave sides of the disks when the gangs are adjusted at right angles to the line of draft. The scrapers are pivotally secured to the beam by means of pivotal bolts $c$, and they are adjustable to or from the disks by means of bolts or screws $c'$, which pass through slots in the scrapers and into the beam.

The disk harrow thus constructed has many essential advantages.

An important advantage is that by employing the long cross-beam extending the full length of the gangs the usual gang-beams and their connections are entirely obviated, thus rendering the harrow cheaper and lighter.

The inner hangers I are also advantageous in that they not only prevent the gangs spreading apart, but they also prevent the inner ends of the gangs rising, while at the same time they permit the gangs to freely fall to accommodate themselves to the undulating surfaces of the ground.

The outer hangers H, with their loops and rollers, are also of special importance, in that they assist the inner hangers in supporting the tongue and cross-beam and driver, and they also serve to guide the shifting-rods E in their movements. By means of the rollers in their loops, which bear upon the upper edges of the shifting-rods, the movements of the rods are greatly facilitated.

The adjustable spring scrapers and the manner of bringing them into play is also important. When it is desired to bring the scrapers against the disks to remove the soil adhering thereto, the driver has simply to throw the lever G'' forward, when the gangs will assume positions at angles to each other, (their inner ends being thrown backward and their outer ends forward,) and the disks will be pressed against the rear ends of the scrapers, as is evident. By means of the set-screws $c'$ and slots in the scrapers the latter may be adjusted to bear with greater or less force upon the disks, according to the nature of the soil.

Heretofore it has been customary to bring the scrapers against the disks by moving them through the medium of levers and bars; but my invention entirely obviates the necessity of such appliances, and therefore simplifies and cheapens the construction of the harrow.

The upper parts of the journal-boxes D are enlarged so as to present a broad bearing-surface to the shifting-rods, the object thereof being to prevent the boxes rotating on the axles and afford a firm and substantial bearing for the rods. This construction will also insure the harrow running level at all times.

The interposed ball C' is covered by my former patent, and is therefore not claimed in this case.

Having thus fully described my invention, what I claim, and desire to secure by Letters Patent, is—

1. The combination of a tongue, a cross-beam carried thereby, disk-gangs journaled in boxes D, provided with broad upper surfaces, said upper surfaces having grooves running at right angles to the gang-axles, shifting-rods connected to the tongue and extending rearwardly under the cross-beam, the rear ends of these rods being pivotally secured in the grooves in the upper surfaces of the boxes D, and hangers secured to the cross-beam and bearing upon the shifting-rods, substantially as described.

2. The combination, with the tongue, the cross-beam extending full length of the gangs, and the disk-gangs, of the rods for shifting the gangs, and the stationary spring-scrapers secured adjustably to the said cross-beam and adapted to bear when the gangs are shifted at an angle to each other upon the disks and clean the same, substantially as described.

3. The combination, with the tongue and cross-beam, of the shifting-rods connected to the tongue and extending rearwardly under the cross-beam, the gangs secured to the rear ends of the shifting-rods, and rigid hangers depending from the cross-beam and bearing upon the shifting-rods, the inner hangers I being provided with extensions to prevent the gangs rising or spreading and the outer hangers being provided with embracing loops carrying anti-friction rollers, substantially as described.

4. The combination, with the tongue, cross-beam, gangs, and shifting-rods, of the hangers H, provided with loops through which pass the shifting-rods, said loops carrying rollers which bear upon said rods, substantially as and for the purpose described.

5. The combination, with the tongue, the cross-beam, gangs, and shifting-rods, of the hangers I, provided with shoulders I', which bear upon the said shifting-rods, and extensions I'', which prevent spreading of the gangs, substantially as and for the purpose described.

6. The combination of the tongue, the cross-beam extending the full length of the disk-gangs, the disk-gangs, the rods for shifting the gangs, and stationary scrapers secured to the said cross-beam and adapted when the gangs are shifted to positions at oblique angles to each other to bear upon the disks and clean the same, substantially as described.

In testimony whereof I affix my signature in presence of two witnesses.

THOMAS MAXON.

Witnesses:
HORACE FRANK,
JOHN L. H. FRANK.